United States Patent [19]

Labana et al.

[11] 4,002,699
[45] Jan. 11, 1977

[54] POWDER COATING COMPOSITION WITH HYDROXY FUNCTIONAL COPOLYMER AND AMINO FUNCTIONAL CROSSLINKING AGENT

[75] Inventors: Santokh S. Labana, Dearborn Heights; Yun Feng Chang, Plymouth, both of Mich.

[73] Assignee: Ford Motor Company, Dearborn, Mich.

[22] Filed: Nov. 25, 1974

[21] Appl. No.: 526,546

Related U.S. Application Data

[63] Continuation-in-part of Ser. No. 407,128, Oct. 17, 1973, abandoned, which is a continuation of Ser. No. 172,223, Aug. 16, 1971, abandoned.

[52] U.S. Cl. .............................. 260/851; 260/18 R; 260/826; 260/827; 260/853; 260/854; 260/855; 260/856; 260/898; 260/899; 260/900; 260/901

[51] Int. Cl.² ................ C08L 33/04; C08L 61/20

[58] Field of Search .......... 260/827, 851, 901, 900, 260/853, 854, 855, 856, 898, 899

[56] References Cited

UNITED STATES PATENTS

| 2,681,897 | 6/1954 | Frazier et al. ..................... 260/850 |
|---|---|---|
| 3,058,951 | 10/1962 | Flowers et al. ..................... 260/901 |
| 3,218,280 | 11/1965 | Koral et al. ......................... 260/901 |
| 3,377,183 | 4/1968 | Hurt, Jr. et al. ..................... 117/17 |
| 3,579,610 | 5/1971 | Petropoulos et al. ............. 260/856 |

*Primary Examiner*—J. Ziegler
*Attorney, Agent, or Firm*—Roger L. May; Keith L. Zerschling

[57] ABSTRACT

Powder coating compositions are disclosed which, exclusive of pigments and other nonreactant components comprise a coreactive mixture of: (A) a copolymer of between about 5 and about 20 weight percent of a hydroxy bearing monomer and between about 95 and about 80 weight percent of other monoethylenically unsaturated monomers, said copolymer having a glass transition temperature in the range of about 40° C to about 90° C and a number average molecular weight ($\overline{M}_n$) of between about 2,000 and about 10,000; an amino crosslinking agent, said crosslinking agent being present in an amount of from about 0.8 to about 1.1 crosslinkable functional groups for each hydroxy group in the copolymer; and a polymeric flow control agent in an amount ranging from about 0.05 to 4.0 weight percent based on the total composition.

8 Claims, No Drawings

POWDER COATING COMPOSITION WITH HYDROXY FUNCTIONAL COPOLYMER AND AMINO FUNCTIONAL CROSSLINKING AGENT

This application is a Continuation-In-Part of Application Ser. No. 407,128 filed Oct. 17, 1973 and now abandoned which, in turn, is a Continuation of Application Ser. No. 172,223, filed Aug. 16, 1971, now abandoned, and relates to thermosetting powder paint compositions which are useful for providing protective and decorative surface coatings on a variety of substrates including glass, metal and other substrates which can withstand the curing temperature of the powder.

Powder coating compositions have become increasingly desirable in recent years for various reasons including those relating to ecology, health and safety. In particular, powder coating compositions are preferable to liquid paints. Such paints, as exemplified by the paint system shown in U.S. Pat. No. 2,857,354, issued Oct. 21, 1958, contain large amounts of solvents which must be volatilized after application during drying, thus resulting in solvents escaping into the atmosphere and creating health and safety hazards as well as undesirable pollution problems. The powder coating compositions of this invention, on the other hand, release little, if any, volatile materials when cured. In addition, the powders have good stability at room temperature, have fast cure times at elevated temperatures, form hard coatings exhibiting excellent solvent resistance, are non-yellowing on over-bake and are usable with metallic pigments. The cured coatings from preferred compositions of this invention have a high gloss and smooth finish with a low amount of craters therein.

SUMMARY OF THE INVENTION

The powder coating compositions of this invention, exclusive of pigments and other nonreactive components, comprise a coreactable mixture of: (A) a copolymer of between about 5 and about 20 weight percent of a hydroxy bearing monomer and between about 95 and about 80 weight percent of other monoethylenically unsaturated monomers, said copolymer having a glass transition temperature in the range of about 40° C to about 90° C and a number average molecular weight ($\overline{M}_n$) of between about 2,000 and about 10,000; (B) an amino crosslinking agent for the hydroxy bearing copolymers in an amount ranging from about 0.8 to about 1.1 crosslinkable amino functional groups for each hydroxy group in the copolymer; and (C) a polymeric flow control agent in an amount ranging from about 0.05 to about 4.0 weight percent based on the total weight of the composition. In addition, the powder coating compositions may include additives such as catalysts, flow control agents, anti-static agents, pigments, plasticizers, etc.

DETAILED DESCRIPTION OF THE INVENTION

Hydroxy Functional Copolymer

The principal material in the powder coating compositions of this invention is a hydroxy functional copolymer which may be formed by conventional free radical induced polymerization of suitable unsaturated monomers. The term "copolymer" as used herein means a polymer of two or more different monomers.

The copolymers used to prepare the copolymers of the powder coating compositions of the invention contain between about 5 and about 20 weight percent, preferably between about 8 and about 15 weight percent, and still more preferably about 12 weight percent, of a hydroxy bearing monomer. These monomers provide the copolymer with its pendant hydroxy functionality. The long list of hydroxy functional monomers which may be employed in the copolymers of the invention includes, but is not limited to, the following esters of acrylic or methacrylic acid and aliphatic alcohols: 2-hydroxyethyl acrylate; 3-chloro-2-hydroxypropyl acrylate; 2-hydroxy-1-methylethyl acrylate; 2-hydroxypropyl acrylate; 3-hydroxypropyl acrylate; 2,3 dihydroxypropyl acrylate; 2-hydroxybutyl acrylate; 4-hydroxybutyl acrylate; diethyleneglycol acrylate; 5-hydroxypentyl acrylate; 6-hydroxyhexyl acrylate; triethyleneglycol acrylate; 7-hydroxyheptyl acrylate; 2-hydroxymethyl methacrylate; 3-chloro-2-hydroxypropyl methacrylate; 2-hydroxy-1-methylethyl methacrylate; 2-hydroxypropyl methacrylate; 3-hydroxypropyl methacrylate; 2,3 dihydroxypropyl methacrylate; 2-hydroxybutyl methacrylate; 4-hydroxybutyl methacrylate; 3,4 dihydroxybutyl methacrylate; 5-hydroxypentyl methacrylate; 6-hydroxyhexyl methacrylate; 1,3-dimethyl-3-hydroxybutyl methacrylate; 5,6 dihydroxyhexyl methacrylate; and 7-hydroxyheptyl methacrylate. Although one of ordinary skill in the art will recognize that many different hydroxy bearing monomers including those listed above may be employed, the preferred hydroxy functional monomers for use in the copolymer of this invention are: 2-hydroxyethyl acrylate; 2-hydroxyethyl methacrylate, hydroxypropyl acrylate and hydroxypropyl methacrylate.

The remainder of the monomers forming the hydroxy functional copolymer, i.e., between about 95 and about 80 weight percent, preferably between about 92 and about 85 weight percent, and most preferably 88 weight percent, are other monoethylenically unsaturated monomers. The monoethylenically unsaturated monomers are preferably alpha-beta olefinically unsaturated monomers, i.e., monomers bearing olefinic unsaturation between the two carbon atoms in the alpha and beta positions with respect to the terminus of an aliphatic carbon-to-carbon chain.

Among the alpha-beta olefinically unsaturated monomers which may be employed are acrylates (meaning esters of both acrylic and methacrylic acids) as well as mixtures of acrylates and vinyl hydrocarbons. Preferably, in excess of 50 weight percent of the total copolymer monomers are esters of a $C_1$–$C_{12}$ monohydric alcohol and acrylic or methacrylic acid, e.g., methyl methacrylate, ethyl acrylate, butyl acrylate, butyl methacrylate, hexyl acrylate, 2-ethylhexylacrylate, lauryl methacrylate, etc. Among the monovinyl hydrocarbons suitable for use in forming the copolymer are those containing 8 to 12 carbon atoms and including styrene, alpha methyl styrene, vinyl toluene, t-butyl styrene and chlorostyrene. When such monovinyl hydrocarbons are employed, they sould constitute less than 50 weight percent of the copolymer. Other vinyl monomers such as vinyl chloride, acrylonitrile, methacrylonitrile, and vinyl acetate may be included in the copolymer as modifying monomers. However, when employed these modifying monomers should constitute only between about 0 and about 35 weight percent of the monomers in the copolymer.

The hydroxy functional copolymers used in the coating compositions of the invention have a glass transition temperature between about 40° C and about 90° C, preferably between about 50° and about 80° C, and most preferably between about 50° C and about 70° C. The molecular weight ($\overline{M}_n$) range for the copolymer may be between about 2,000 and about 10,000 preferably between about 3,000 and about 6,500, and more preferably between about 3,000 and about 4,000. A preferred copolymer for use in the coating compositions of this invention has a glass transition temperature between about 50° C and about 80° C and a molecular weight of between about 3,000 and about 6,500. A still more preferred copolymer has a glass transition temperature between about 50° C and about 70° C and a molecular weight between about 3,000 and about 4,000.

In preparing the copolymer, the hydroxy functional monomer and the remaining monoethylenically unsaturated monomers are mixed and reacted by conventional free radical initiated polymerization in such proportions as to obtain the copolymers desired. A large number of free radical initiators are known to the art and are suitable for this purpose. These include: benzoyl peroxide; lauryl peroxide; t-butylhydroxy peroxide; acetylcyclohexane sulfonyl peroxide; diisobutyryl peroxide; di-(2-ethylhexyl) peroxydicarbonate; diisopropyl peroxydicarbonate; t-butylperoxypivalate; decanoyl peroxide; azobis (2-methyl-propionitrile); etc. Polymerization is preferably carried out in solution using a solvent in which the hydroxy functional copolymer is soluble. Included among these solvents are toluene, xylene, dioxane, butanone, etc. If the hydroxy functional copolymer is prepared in solution, the solid copolymer can be precipitated by pouring the solution at a slow rate into a non-solvent for the copolymer such as hexane, octane, or water under suitable agitation conditions. The copolymer thus obtained is then further dried so that it contains less than 3% of the materials that volatilize at temperatures used for baking the coating. Alternatively, the copolymer can be obtained by evaporating the solvents under vacuum or by employing spray drying techniques.

These copolymers can also be prepared by emulsion polymerization, suspension polymerization, bulk polymerization or other suitable methods. In these methods of preparing the copolymers, chain transfer agents may be required to control the molecular weight of the copolymer to a desired range. However, when chain transfer agents are used care must be taken so that they do not decrease the shelf stability of the powder by causing premature chemical reaction. The solid copolymers obtained by these methods must also be dried to contain less than 3% of the materials that volatilize at the temperatures used for baking the coating.

The molecular weight and molecular weight distribution of the hydroxy functional copolymer is important in obtaining outstanding powder coating compositions. While the molecular weight ($\overline{M}_n$) may range from about 2,000 to about 10,000, the copolymer component must not contain significant amounts of higher molecular weight fractions. Thus, no more than 2% of the copolymer should be of molecular weight greater than 20,000 and the molecular weight distribution as measured by the ratio of weight average molecular weight to number average molecular weight ($M_w/M_n$) should be in the range of 1.6 to 2.1, with the preferred range of molecular weight distribution being in the range of 1.7 to 1.8.

Crosslinking Agent

The amino crosslinking agents useful as crosslinkers in the powder coating compositions of this invention are condensation products of formaldehyde with melamine, substituted melamines urea or substituted and unsubstituted benzo guanamine. Such multifunctional amino compounds, which are widely used in the coating industry, may be used in monomeric, polymeric or a mixture of monomeric and polymeric forms. These amino crosslinking agents, which are present in the powder coating compositions of this invention in an amount ranging from about 0.8 to about 1.1 crosslinkable amino functional groups for each hydroxy group in the copolymer, reacts with the hydroxy functionality of the copolymer during baking or curing to form a tough, resistant coating.

Among the various monomeric melamine-formaldehyde crosslinkers which may be used are hexamethoxymethyl melamine, trimethoxy-methyl trimethylol melamine, tributoxy methyl trimethoxymethyl melamine and tributoxy methyl trimethylol melamine, trimethoxymethyl melamine and tributoxymethyl melamine. Exemplary of the various polymeric melamine formaldehyde crosslinking agents useful in the powder compositions of the invention include methylated melamine-formaldehyde resin, butylated melamine-formaldehyde resin, and isobutylated melamine-formaldehyde resin. The chemical structure of polymeric melamine formaldehyde is

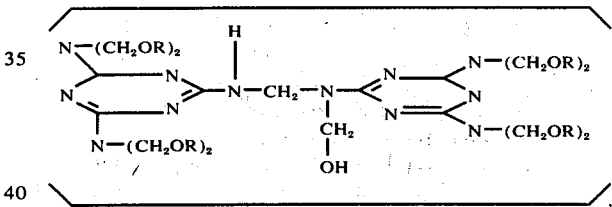

where R = —CH$_3$; —n C$_4$H$_9$; —iso C$_4$H$_9$ and n may vary from 2 to 20.

Monomeric urea-formaldehyde crosslinking agents useful in the disclosed compositions include, but are not limited to, dimethoxymethyl urea; monomethoxymethyl urea; and dimethylolethylene urea. Polymeric urea-formaldehyde resin crosslinkers include methylated, butylated and isobutylated urea-formaldehyde resins. Their chemical structures are represented by:

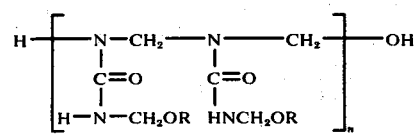

where R = —CH$_3$; —nC$_4$H$_9$; —iso—C$_4$H$_9$ $n$ = 2 to 20.

Exemplary of the monomeric condensation reaction products of formaldehyde and benzo-guanamine or substituted benzoguanamine are dimethoxymethylbenzoguanamine, dibutoxymethylbenzoguanamine, dimethylolbenzoguanamine, dimethoxymethyl-2-methylbenzoguanamine, tetramethoxymethyl-3-chlorobenzoguanamine. A suitable polymeric condensation product of this type is butylated benzoguanamine-formaldehyde resin. The chemical structure for such condensation product resins is represented by:

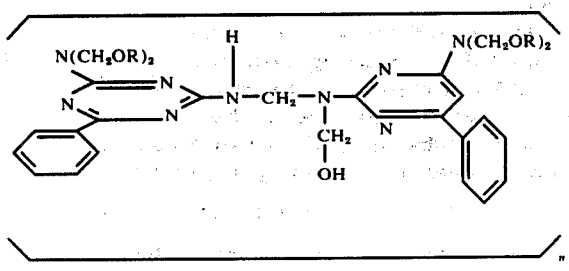

where R = —CH$_3$; —nC$_4$H$_9$; —isoC$_4$H$_9$ and $n$ = 2 to 20.

A number of methods for preparing melamine formaldehyde resins, urea formldehyde resins and guanamine formaldehyde resins are well known in the art. The method chosen depends on the various properties, reactivity and rate of cure desired for the resin product. The means available for varying these properties include control of formaldehyde to melamine or urea ratio, the type or quantity of alcohol reactant, variation in degree of condensation prior to reaction with alcohol, variation in degree of alkoxylation, reaction medium and catalysts employed. For purposes of illustration, the methods for preparing hexamethoxymethyl melamine, butylated melamineformaldehyde resin, dimethoxymethyl urea and butylated ureaformaldehyde resin are set forth below:

A. Preparation of hexamethoxymethyl melamine resin 704g of a 55% solution of methyl formel and 0.2g of ION sodium hydroxide are charged to a reaction flask resulting in a pH of 9.3. The flask is heated to 80° C and 252g of melamine added. The reaction mixture is then heated to reflux and refluxed for 30 minutes. The reactants are then cooled to 35° C and 454g of methanol and sulfuric acid are charged to the vessel to give a pH of 1.0. The reaction temperature is maintained at 35°–39° C for 1 hour. The heat is next removed and the solution neutralized with 50% sodium hydroxide. Hexamethoxymethyl melamine is obtained after filtration and stripping the solvent.

B. Preparation of butylated melamine formaldehyde resin 365g of a 37% aqueous solution of formaldehyde, sufficient sodium hydroxide to neutralize the formaldehyde to a pH of 8.5 and 126g of melamine are charged successively to a reaction vessel. The reaction mixture is heated to refluxing temperature in about 0.5 hr. and refluxed to 1.5 to 2 hours. 613g of N-butanol is added together with 1.7g of 85% phosphoric acid. The butanol is introduced incrementally so as to maintain a clear solution and the solution is refluxed for an additional hour, after which the water and N-butanol are removed to give a solvent-free butylated melamine-formaldehyde resin.

C. Preparation of dimethoxymethyl urea resin 10g of dimethylol urea is added to 100ml of methanol containing 1 drop of 5N hydrochloric acid. Five minutes after solution occurs the solution is neutralized with silver carbonate. Following filtration and concentration, crystal of dimethoxymethyl urea are separated.

D. Preparation of butylated urea-formaldehyde resin 2430g of a 37% aqueous solution of formaldehyde is charged to a reaction vessel. Dilute potassium hydroxide is then added to bring the pH to 8 to 9. 600g of urea and 2,000g of n-butanol are next added and the reaction mixture heated to 100° C in ½ hour and refluxed for 1 hour. Phosphoric acid is then added to bring the pH to 5 to 6 and the solution is refluxed for another hour before the solvent is removed under vacuum.

Flow Control Agent

The coating compositions of this invention include a flow control agent in an amount of between about 0.05 and about 4.0 weight percent based on the total composition. In general, the flow control agent should be a polymer having a number average molecular weight of at least 1000, have a surface tension which is lower than the surface tension of the copolymer employed in the coating composition at the baking temperature of the powder coating composition, and have a glass transition temperature which is at least 50°C below the glass transition temperature of the hydroxy containing copolymer. The polymeric flow control agent must be such that it will not affect the viscosity of the powder to a significant degree, but aid in closing pores and voids during film formation. In order for pore closure to take place the spreading of the molten copolymer must be retarded and this can usually be accomplished by addition of a small amount of such a polymer flow control agent which has a lower surface tension than the surface tension of the copolymer used in the composition. However, the minimum molecular weight of the flow control agent is important since too low a molecular weight and therefore to low a viscosity, will result in the flow control agent diffusing out from the molten copolymer and filling the voids and pores itself, thus producing a film with nonhomogeneous composition which has neither good appearance nor good weathering properties. Also, polymeric flow control agents of too low a molecular weight tend to diffuse to the surface of the powder particles during storage and usually cause caking.

Among the many polymeric flow control agents which may be employed are acrylic polymers, which may be prepared by polymerization of acrylate and methacrylate monomers in bulk or in suitable solvents using well known free radical initiators. These preferred acrylic polymers are prepared using an initiator and polymerization conditions which will result in a polymer having molecular weight ($\overline{M}_n$) above 1,000, preferably above 3000 and most preferably between about 5,000 and about 20,000. Among the preferred acrylic polymers useful as flow control agents are polylauryl acrylate, polybutyl acrylate, poly(2-ethylhexyl acrylate), polylauryl methacrylate and polyisodecyl methacrylate.

Although acrylate flow control agents are preferred, fluorinated polymers having a surface tension, at the baking temperatures of the powder, lower than that of the copolymer used in the mixture may be employed. Preferred flow control agents, if the agent is a fluorinated polymer are esters of polyethyleneglycol or polypropyleneglycol and fluorinated fatty acids. For example, an ester of polyethyleneglycol of molecular weight of over 2,500 and perfluoroctanoic acid is a useful flow control agent. Polymeric siloxanes of molecular weight ($\overline{M}_n$) over 1,000, advantageously 1,000 to 20,000, may also be useful as flow control agents, e.g., alkyl substituted siloxanes such as polydimethyl siloxane, polymethylphenyl siloxane, polydiphenyl siloxane, etc. and halogenated siloxanes such as poly (3,3,3-trifluoropropylmethyl siloxane), poly(perfluordimethyl siloxane), poly(pentafluorophenylmethyl siloxane), etc. It will be appreciated by those skilled in the art that while the specific flow control agents enumerated above are preferred, many other flow control agents meeting the above-identified requirements for this component may be employed.

Additional Additives

The coating compositions formed in accordance with the teachings of this invention may, and preferably do, include a small amount, generally from about 0.05% weight to about 3.0% by weight of the total weight of the powder composition, of a catalyst in order to increase the crosslinking rate of the powder coating during baking. Baking temperatures ordinarily are in the range of about 130° C to about 200° C, preferably about 14° C to about 170° C, and the catalyst should produce a gel time at the baking temperature of between about 1 minute and about 40 minutes. Preferably, however, the gel time is in the range of about 1 to about 10 minutes and most preferably is in the range of about 2 to about 8 minutes. Among the many suitable catalysts, which are peferably solid at room temperature and have a melting point of from 50° C to 200° C are organic acids and compounds that generate acids on heating above 100° C. Included among these are paratoluene sulfonic acid, methyl paratoluene sulfonate, butyl phosphoric acid, monodibutyl orthophosphate and maleic acid. Some carboxylic acids such as acrylic and methacrylic acid, which can be copolymerized into the copolymers are also effective catalysts. When such acids are used, the preferred range is between about 0.5 and 3 weight percent.

Since the powder coating composition of the invention may be applied to articles by electrostatic spray techniques, the composition may also include a small weight percent of an antistatic agent. In particular, the antistatic agent is included in a range from about 0.05 weight percent to about 1.0 weight percent of the total powder composition. Suitable antistatic agents include, but are not limited to tetraalkylammonium salts, alkylpoly(ethyleneoxy) phosphates as, for example, dibutylpoly(ethyleneoxy)phosphate; alkylaryl poly (ethyleneoxy) phosphates, as for example, ethylbenzylpoly (ethyleneoxy) phosphate; polyethyleneimine, poly(2-vinylpyrollidone), phridinium chloride, poly(vinylpyndium chloride), polyvinyl alcohol or inorganic salts.

In order to give individual powder coating compositions a suitable color, a pigment may be included. In general, the pigments forms from about 6 to about 35 weight percent of the total powder coating composition. Pigments which are suitable for powder coating compositions include, but are not limited to, the following: basic lead silica chromate, 30 percent by weight (orange); titanium dioxide, 30 percent by weight (white); titanium dioxide 15 weight percent plus ultramarine blue, 10 weight percent (blue); phthalocyanine blue, 7 weight percent, plus titanium dioxide, 10 weight percent (blue); pththalocyanine green, 7 weight percent, plus titanium dioxide, 10 weight percent (green); ferrite yellow, 7 weight percent, plus titanium dioxide, 10 weight percent (yellow); carbon black, 6 weight percent (black); black iron oxide, 10 weight percent (black); chromium green oxide, 8 weight percent, plus titanium dioxide, 10 weight percent (green); Quindo red, 5 weight percent plus titanium dioxide, 16 weight percent (red); and iron oxide transparent orange pigment, 10 weight percent (orange). Metallic pigments such as aluminum may also be included up to 10 weight percent to give the baked coating a metallic appearance.

Having described the various materials which are employed in formulating the powder coating compositions of this invention, a plurality of examples are hereinafter set forth to illustrate the same. It should be understood that the specific examples are presented by way of illustration and not by way of limitation.

EXAMPLE 1

The monomers, 2-hydroxyethyl methacrylate 15 parts, ethyl acrylate 25 parts, acrylic acid 2 parts, methyl methacrylate 58 parts and the initiator 2,2'-azobis-(2-methyl propronitrile) (AIBN) 4 parts are mixed together. A one liter, four-necked flask is provided which contains 150 ml of toluene and 150 ml of methyl ethyl ketone. The contents of the flask is heated to a refluxing temperature of 85° C. The monomer mixture (208 grams) is added in a dropwise fashion over a period of one and a half hours to the reaction mixture which is maintained at 85° C. After the monomer addition is complete, 0.5 grams of AIBN (dissolved in 20 grams of toluene) is added dropwise. The refluxing is continued for an additional one half hour to complete the polymerization.

The solution is poured into shallow stainless steel trays. These trays are placed in a vacuum oven and the solvent evaporated therefrom. As the solvent is removed, the copolymer becomes more concentrated. The temperature of the vacuum oven is raised to 110° C. Drying is continued until the solvent content of the copolymer is below 3 percent. The trays are cooled and the copolymer collected and ground to pass through 20 mesh screen.

One hundred parts by weight of the ground copolymer are mixed with the following materials:

| | |
|---|---|
| Hexamethoxymethyl-melamine | 8.0 parts |
| Polylauryl acrylate ($\overline{M}_n = 5,000$) | 0.7 parts |
| Titanium dioxide | 30 parts |

The materials are mixed together in a ball mill for 2 hours. The mixture is mill rolled at 85° C to 90° C for 5 minutes. The solid obtained is ground in a ball mill to pass through a 140 mesh screen.

The resulting powder thus obtained is a powder coating of this invention. The powder is sprayed on an electrically grounded, steel panel by using an electrostatic powder spray gun operating at 50 KV charging voltage. After spraying, the panel is heated to a temperature of 175° C for 20 minutes.

The coating obtained on the panel has good adhesion to the steel panel. The coating also is applied to and has good adhesion on panels of glass, brass, zinc, aluminum, copper and bronze. The coating is not soluble in toluene, gasoline, butanone or methanol.

EXAMPLE 2

The procedure of Example 1 is repeated. The formation of the copolymer, however, begins with a monomer mixture having 2-hydroxyethyl methacrylate 10 parts, butyl methacrylate 40 parts, methyl methacrylate 50 parts, and the initiator AIBN 4 parts. The resulting copolymer has a molecular weight ($\overline{M}_n$) of 3,500.

One hundred parts by weight of the ground copolymer is mixed with the following materials:

| | |
|---|---|
| Hexamethoxymethyl-melamine | 7 parts |
| 1-naphthalene sulfonic acid | 0.6 parts |
| Poly(2-ethylhexyl acrylate) (M = 9,000) | 0.5 parts |
| Quindo red | 4 parts |
| Metallic aluminum flakes | 4 parts |

A powder coating composition obtained from the mixture by following the steps of Example 1 is applied to test panels as described in Example 1. The panels are baked at 160° C for 15 minutes. The panels produced have good solvent resistance and a metallic appearance.

EXAMPLE 3

The procedure of Example 1 is repeated. The formation of the copolymer, however, begins with a monomer mixture having hydroxypropyl methacrylate 15 parts, acrylic acid 2 parts, butyl methacrylate 43 parts, methyl methacrylate 50 parts and the initiator AIBN 1 part. The resulting copolymer has a molecular weight ($\overline{M}_n$) of 10,000.

One hundred parts by weight of the ground copolymer is mixed with the following materials:

| | |
|---|---|
| Trimethoxymethyl-melamine | 9 parts |
| Butylphosphoric acid | 0.5 parts |
| Polybutylacrylate ($\overline{M}_n$ = 15,000) | 0.3 parts |
| Titanium dioxide | 10 parts |
| Phthalocyanine blue | 7 parts |

A powder coating composition is obtained from the mixture by following the process steps set forth in Example 1. The coating composition is applied to a series of test panels and baked at 140° C for 30 minutes. The coatings obtained on the various panels are of good appearance and are resistant to the solvents mentioned in Example 1.

EXAMPLE 4

The procedure of Example 1 is repeated. The formation of the copolymer, however, begins with a monomer mixture having 2-hydroxypropyl acrylate 10 parts, styrene 70 parts, butyl acrylate 20 parts and the initiator AIBN 2 parts. The resulting copolymer has a molecular weight ($\overline{M}_n$) of 6,500.

One hundred parts by weight of the ground copolymer is mixed with the following materials:

| | |
|---|---|
| Tributoxymethyl-melamine | 6 parts |
| 1-naphthalene sulfonic acid | 0.5 parts |
| Polybutyl acrylate ($\overline{M}_n$ = 5,000) | 0.4 parts |
| Phthaloycanine green | 7 parts |
| Titanium dioxide | 10 parts |

A powder coating composition is obtained from the mixture by following the process steps set forth in Example 1. The coating composition is applied to a series of test panels and baked at 160° C for 30 minutes. The coatings obtained on the various panels are of good appearance and are resistant to the solvents set forth in Example 1.

EXAMPLE 5

The procedure of Example 1 is repeated. The formation of the copolymer, however, begins with a monomer mixture having 2-hydroxypropyl methacrylate 20 parts, 2-ethylhexyl acrylate 10 parts, methacrylic acid 2 parts, methyl methacrylate 68 parts and the initiator AIBN 3 parts. The resulting copolymer has a molecular weight ($\overline{M}_n$) of 4,500.

One hundred parts by weight of the ground copolymer is mixed with the following materials:

| | |
|---|---|
| Tributoxytrimethylol-melamine | 10 parts |
| Poly (2-ethylhexyl acrylate) ($\overline{M}_n$ = 20,000) | .5 parts |
| Ferrite yellow | 7 parts |
| Titanium dioxide | 10 parts |

A powder coating composition is obtained from the mixture by following the process steps set forth in Example 1. The coating composition is applied to a series of test panels and baked at 160° C for 30 minutes. The coatings obtained on the various panels are of good appearance quality and are resistant to the solvents set forth in Example 1.

Example 6

The procedure of Example 1 is repeated. The formation of the copolymer, however, begins with a monomer mixture having N-methylolacrylamide 10 parts, ethyl methacrylate 90 parts and the initiator AIBN 1.5 parts. The resulting copolymer has a molecular weight ($\overline{M}_n$) of 8,500.

One hundred parts by weight of the ground copolymer is mixed with the following materials:

| | |
|---|---|
| Butylated melamine-formaldehyde resin ($\overline{M}_n$ = 2,500) | 8 parts |
| Butyl phosphoric acid | 0.7 parts |
| Poly (isodecyl methacrylate) ($\overline{M}_n$ = 9,000) | 0.5 parts |
| Transparent blue | 4 parts |
| Metallic aluminum flakes | 4 parts |

A powder coating composition is obtained from the mixture by following the process steps set forth in Example 1. The coating composition is applied to a series of test panels as described in Example 1 and baked at a temperature of 150° C for 20 minutes. The coatings obtained on the various panels have a metallic appearance and are resistant to the solvents mentioned in Example 1.

EXAMPLE 7

The procedure of Example 1 is repeated. The formation of the copolymer, however, begins with a monomer mixture having hydroxymethyldiacetone acrylamide 5 parts, butyl methacrylate 35 parts, methyl methacrylate 60 parts and the initiator AIBN 3 parts.

One hundred parts by weight of the ground copolymer is mixed with the following materials:

| | |
|---|---|
| Butylated melamine-formaldehyde resin ($\overline{M}_n$ = 75,000) | 4 parts |
| p-Toluene sulfonic acid | 0.8 parts |
| Polylauryl methacrylate ($\overline{M}_n$ = 1,500) | 0.8 parts |
| Carbon black | 6 parts |

A powder coating composition is obtained from the mixture by following the process steps of Example 1. The coating composition is applied to a series of test panels as described in Example 1 and baked at a temperature of 160° C for 20 minutes. The coating obtained on the various panels are of good appearance quality and are resistant to the solvents mentioned in Example 1.

EXAMPLE 8

The procedure of Example 1 is repeated. The formation of the copolymer, however, begins with a monomer mixture having 2,3 dihydroxypropyl methacrylate 7 parts, ethyl acrylate 17 parts, acrylic acid 1 part, methyl methacrylate 75 parts and the initiator AIBN 3 parts.

One hundred parts by weight of the ground copolymer is mixed with the following materials:

| | |
|---|---|
| Isobutylated melamine-formaldehyde resin ($\overline{M}_n = 3,000$) | 10 parts |
| Polyethyl acrylate ($\overline{M}_n = 7,500$) | 0.4 parts |
| Chromium green oxide | 8 parts |
| Titanium dioxide | 10 parts |

A powder coating composition is obtained from the mixture by following the process steps of Example 1. The coating composition is applied to a series of test panels as described in Example 1 and baked at 150° C for 20 minutes. The coatings obtained on the various panels are of good appearance quality and are resistant to the solvents mentioned in Example 1.

EXAMPLE 9

The procedure of Example 1 is repeated. The formation of the copolymer, however, begins with a monomer mixture having 4-hydroxybutyl methacrylate 14 parts, ethyl acrylate 5 parts, methacrylic acid 1 part, methyl methacrylate 80 parts and the initiator AIBN 3 parts. The resulting copolymer has a glass transition temperature of 85° C.

One hundred parts by weight of the ground copolymer is mixed with the following materials:

| | |
|---|---|
| Methylated melamine-formaldehyde resin ($\overline{M}_n = 2,000$) | 9 parts |
| Polyisodecyl methacrylate ($\overline{M}_n = 12,000$) | 0.7 parts |
| Quindo red | 4 parts |
| Titanium dioxide | 4 parts |

A powder coating composition is obtained from the mixture by following the process steps of Example 1. The coating composition is applied to a series of test panels as described in Example 1 and baked at a temperature of 170° C for 15 minutes. The coatings obtained on the various panels are of good appearance quality and are resistant to the solvents mentioned in Example 1.

EXAMPLE 10

The procedure of Example 1 is repeated. The formation of the copolymer, however, begins with a monomer mixture having 3,4 dihydroxybutyl methacrylate 10 parts, acrylic acid 2 parts, ethyl acrylate 18 parts, methyl methacrylate 70 parts and the initiator AIBN 3 parts. The resulting copolymer has a glass transition temperature of 68° C.

One hundred parts by weight of the ground copolymer is mixed with the following materials:

| | |
|---|---|
| Methylated melamine-formaldehyde resin ($\overline{M}_n = 4,000$) | 12 parts |
| p-Toluene sulfonic acid | 1 part |
| Poly (2-ethylhexyl acrylate) ($\overline{M}_n = 8,500$) | .5 parts |
| Titanium dioxide | 30 parts |

A powder coating composition is obtained from the mixture by following the process steps of Example 1. The coating composition is applied to a series of test panels as described in Example 1 and baked at a temperature of 150° C for a period of 20 minutes. The coatings obtained on the various panels are of good appearance quality and are resistant to the solvents mentioned in Example 1.

EXAMPLE 11

The procedure of Example 1 is repeated. The formation of the copolymer, however, begins with a monomer mixture having 2-hydroxyethyl methacrylate 15 parts, ethyl acrylate 20 parts, methyl methacrylate 60 parts and the initiator AIBN 3 parts. The resulting copolymer has a glass transition temperature of 60° C.

One hundred parts by weight of the ground copolymer is mixed with the following materials:

| | |
|---|---|
| Dimethoxymethyl urea | 15 parts |
| Butylphosphoric acid | 0.5 parts |
| Polyethyleneglycol perfluoro octoate | 2 parts |
| Carbon black | 6 parts |

A powder coating composition is obtained from the mixture by following the process steps of Example 1. The coating composition is applied to a series of test panels as described in Example 1 and baked at a temperature of 165° C for a period of 20 minutes. The coatings obtained on the various panels are of good appearance quality and are resistant to the solvents mentioned in Example 1.

EXAMPLE 12

The procedure of Example 1 is repeated. The formation of the copolymer, however, begins with a monomer mixture having 2-hydroxyethyl methacrylate 15 parts, ethyl acrylate 30 parts, methyl methacrylate 55 parts and the initiator AIBN 3 parts. The resulting copolymer has a glass transition temperature of 47° C.

One hundred parts by weight of the ground copolymer is mixed with the following materials:

| | |
|---|---|
| Monomethoxymethyl urea | 15 parts |
| p-Toluene sulfonic acid | 0.5 parts |
| Polybutyl acrylate ($\overline{M}_n = 2,500$) | 0.3 parts |
| Phthaloycyanine green | 7 parts |
| Titanium dioxide | 10 parts |

A powder coating composition is obtained from the mixture by following the process steps of Example 1. The coating composition is applied to a series of test panels and baked at a temperature of 150° C for 30 minutes. The coatings obtained on the various panels are of good appearance quality and are resistant to the solvents mentioned in Example 1.

EXAMPLE 13

The procedure of Example 1 is repeated. The formation of the copolymer, however, begins with a monomer mixture having 2-hydroxyethyl methacrylate 15 parts, methyl methacrylate 85 parts and the initiator AIBN 3 parts. The resulting copolymer has a glass transition temperature of 95° C.

One hundred parts by weight of the ground copolymer is mixed with the following materials:

| | |
|---|---|
| Dimethylol ethylene urea | 10 parts |
| Butyl phosphoric acid | 0.5 parts |
| Polylauryl methacrylate | 0.8 parts |
| Carbon black | 6 parts |

A powder coating composition is obtained from the mixture by following the process steps of Example 1. The coating composition is applied to a series of test panels and baked at a temperature of 170° C for 20 minutes. The coating obtained on the various panels shows poor flow characteristics and is excessively brittle.

EXAMPLE 14

The procedure of Example 1 is repeated. The formation of the copolymer, however, begins with a monomer mixture having 1,3 dimethyl-3-hydroxybutyl methacrylate 15 parts, ethyl acrylate 35 parts, methyl methacrylate 50 parts and the initiator AIBN 3 parts. The resulting copolymer has a glass transition temperature of 38° C.

One hundred parts by weight of the ground copolymer is mixed with the following materials:

| | |
|---|---|
| Butylated urea-formaldehyde resin ($\overline{M}_n = 3,000$) | 12 parts |
| p-Toluene sulfonic acid | 1 part |
| Poly (2-ethylhexyl acrylate) | 0.5 parts |
| Titanium dioxide | 30 parts |

A powder coating composition is obtained from the mixture by following the process steps of Example 1. The coating composition is applied to a series of test panels as described in Example 1 and baked at 150° C for 20 minutes. The powder obtained shows excessive caking and is difficult to fluidize for the elastrostatic spray application.

EXAMPLE 15

The procedure of Example 1 is repeated. The formation of the copolymer, however, begins with a monomer mixture having N-methylolacrylamide 10 parts, cyclohexyl acrylate 40 parts, methyl methacrylate 40 parts, methacrylonitrile 10 parts and the initiator AIBN 4 parts.

One hundred parts by weight of the ground copolymer is mixed with the following materials:

| | |
|---|---|
| Methylated urea-formaldehyde resin ($\overline{M}_n = 3,500$) | 10 parts |
| p-Toluene sulfonic acid | 0.5 parts |
| Polytridecyl methacrylate ($\overline{M}_n = 3,000$) | 1 part |

A powder coating composition is obtained from the mixture by following the process steps of Example 1. The coating composition is applied to a series of test panels as described in Example 1 and baked at 140° C for 30 minutes. The coatings obtained on the various panels are of good appearance quality and are resistant to the solvents mentioned in Example 1.

EXAMPLE 16

The procedure of Example 1 is repeated. The formation of the copolymer, however, begins with a monomer mixture having 2-hydroxyethyl acrylate 15 parts, 2-ethylhexyl acrylate 10 parts, acrylic acid 2 parts, acrylonitrile 13 parts, cyclohexyl methacrylate 60 parts and the initiator AIBN 4 parts.

One hundred parts by weight of the ground copolymer is mixed with the following materials:

| | |
|---|---|
| Dimethylol ethylene urea | 12 parts |
| Poly (2-ethylhexyl acrylate) ($\overline{M}_n = 90,000$) | 1 part |
| Titanium dioxide | 30 parts |

A powder coating composition is obtained from the mixture by following the process steps of Example 1. The coating composition is applied to a series of test panels as described in Example 1 and baked at 175° C for 20 minutes. The coatings obtained on the various panels is of good appearance quality and are resistant to the solvents mentioned in Example 1.

EXAMPLE 17

The procedure of Example 1 is repeated. The formation of the copolymer, however, begins with a monomer mixture having hydroxymethyl diacetone acrylamide 7 parts, n-octyl methacrylate 23 parts, methyl methacrylate 40 parts, styrene 30 parts and the initiator AIBN 4 parts.

One hundred parts by weight of the ground copolymer is mixed with the following materials:

| | |
|---|---|
| Methylated urea-formaldehyde resin ($\overline{M}_n = 4,500$) | 6 parts |
| Polybutyl acrylate ($M_n = 50,000$) | 0.3 parts |
| Titanium dioxide | 30 parts |

A powder coating composition is obtained from the mixture by following the process steps of Example 1. The coating composition is applied to a series of test panels as described in Example 1 and baked at a temperature of 160° C for 20 minutes. The coatings obtained on the various panels are of good appearance quality and are resistant to the solvents mentioned in Example 1.

EXAMPLE 18

The procedure of Example 1 is repeated. The formation of the copolymer, however, begins with a monomer mixture having hydroxypropyl methacrylate 15 parts, butyl methacrylate 10 parts, isopropyl methacrylate 75 parts and the initiator AIBN 3 parts.

One hundred parts by weight of the ground copolymer is mixed with the following materials:

| | |
|---|---|
| Butylated urea-formaldehyde resin ($\overline{M}_n = 4,500$) | 12 parts |
| Polybutyl acrylate ($\overline{M}_n = 2,500$) | 0.5 parts |
| Titanium dioxide | 30 parts |

A powder coating composition is obtained from the mixture by following the process steps of Example 1. The coating composition is applied to a series of test panels as described in Example 1 and baked at a temperature of 170° C for 20 minutes. The coatings obtained on the various test panels are of good appearance quality and are resistant to the solvents mentioned in Example 1.

EXAMPLE 19

The procedure of Example 1 is repeated. The formation of the copolymer, however, begins with a monomer mixture having hydroxypropyl acrylate 15 parts, methacrylic acid 2 parts, ethylthioethyl-methacrylate 1 part, ethyl methacrylate 72 parts, isobutyl acrylate 10 parts and the initiator AIBN 3 parts.

One hundred parts by weight of the ground copolymer is mixed with the following materials:

| | |
|---|---|
| Butylated benzoguanamine-formaldehyde resin ($\overline{M}_n = 4,000$) | 8 parts |
| Polyethylene glycol perfluoro octoate ($\overline{M}_n = 6,000$) | 2 parts |
| Titanium dioxide | 30 parts |

A powder coating composition is obtained from the mixture by following the process steps of Example 1. The coating composition is applied to a series of test panels as described in Example 1 and baked at a temperature of 160° C for 30 minutes. The coatings obtained on the various panels are of good appearance quality and are resistant to the solvents mentioned in Example 1.

EXAMPLE 20

The procedure of Example 1 is repeated. The formation of the copolymer, however, begins with a monomer mixture having N-methylolacrylamide 5 parts, 2-hydroxyethyl methacrylate 10 parts, ethyl acrylate 25 parts, methyl methacrylate 60 parts and the initiator AIBN 3 parts.

One hundred parts by weight of the ground copolymer is mixed with the following materials:

| | |
|---|---|
| Methylated benzoguanamine-formaldehyde resin ($\overline{M}_n = 3,600$) | 5 parts |
| Naphthalene sulfonic acid | 1 part |
| Poly (2-ethylhexyl acrylate) | 0.8 parts |
| Titanium dioxide | 30 parts |

A powder coating composition is obtained by following the process steps of Example 1. The coating composition is applied to a series of test panels as described in Example 1 and baked at a temperature of 150° C for 20 minutes. The coatings obtained on the various panels are of good appearance quality and are resistant to the solvents mentioned in Example 1.

Many modifications of this invention will be apparent to those skilled in the art in view of this specification. It is intended that all such modifications which fall within the scope of this invention be included within the appended claims.

We claim:

1. A powder coating composition which, exclusive of pigments and other nonreactive components, comprises a coreactive mixture of: (A) a copolymer of about 5 to about 20 weight percent of a hydroxy functional monoethylenically unsaturated monomer selected from the group consisting of hydroxyl bearing aliphatic alcohol esters of acrylic and methacrylic acid and about 95 to about 80 weight percent of other monomers containing alpha-beta olefinic unsaturation, said copolymer having a glass transition temperature in the range of about 40° C to about 90° C and a molecular weight ($\overline{M}_n$) in the range of 2,000 to 10,000; (B) an amino functional crosslinking agent of condensation products of formaldehyde and an amine of melamine, substituted melamines, urea, benzoguanamine or substituted benzoguanamines in an amount of between about 0.8 and about 1.1 crosslinkable functional groups for each hydroxy group in the copolymer; and (C) from about 0.05 to about 4.0 weight percent based on the total weight of said coating composition of a polymeric flow control agent having a number average molecular weight of at least 1,000, a surface tension which is lower than the surface tension of said copolymer at the baking temperature of said composition and a glass transition temperature which is at least 50° C below the glass transition temperature of said copolymer and which consists essentially of an acrylic polymer prepared by polymerization of acrylate or methacrylate monomers.

2. A powder coating composition in accordance with claim 1 wherein said copolymer has a glass transition temperature between about 50° C and about 80° C and a molecular weight ($\overline{M}_n$) between about 3,000 and about 6,500.

3. A powder coating composition in accordance with claim 1 wherein said copolymer has a glass transition temperature between about 50° C and about 70° C and a molecular weight ($\overline{M}_n$) between about 3,000 and about 4,000.

4. A powder coating composition in accordance with claim 1 wherein said other monomers consist essentially of monofunctional alpha-beta olefinically unsaturated monomers selected from acrylates or mixtures of acrylates and monovinylhydrocarbons containing 8 to 12 carbon atoms.

5. A powder coating composition in accordance with claim 4 wherein said other monomers consist essentially of esters of $C_1$–$C_8$ monohydric alcohols and acrylic or methacrylic acid.

6. A powder coating composition in accordance with claim 4 wherein modifying monomers selected from the group consisting of vinyl chloride, acrylonitrile, methacrylonitrile and vinyl acetate are included in an amount ranging between about 0 weight percent and about 35 weight percent of said copolymer.

7. A powder coating composition in accordance with claim 1 wherein said crosslinking agent is monomeric.

8. A powder coating composition in accordance with claim 1 wherein said crosslinking agent is polymeric.

* * * * *